April 30, 1957    R. O. BIRCHLER ET AL    2,790,359
APPARATUS FOR PROFILING ARTICLES
Filed Nov. 23, 1953    3 Sheets-Sheet 3

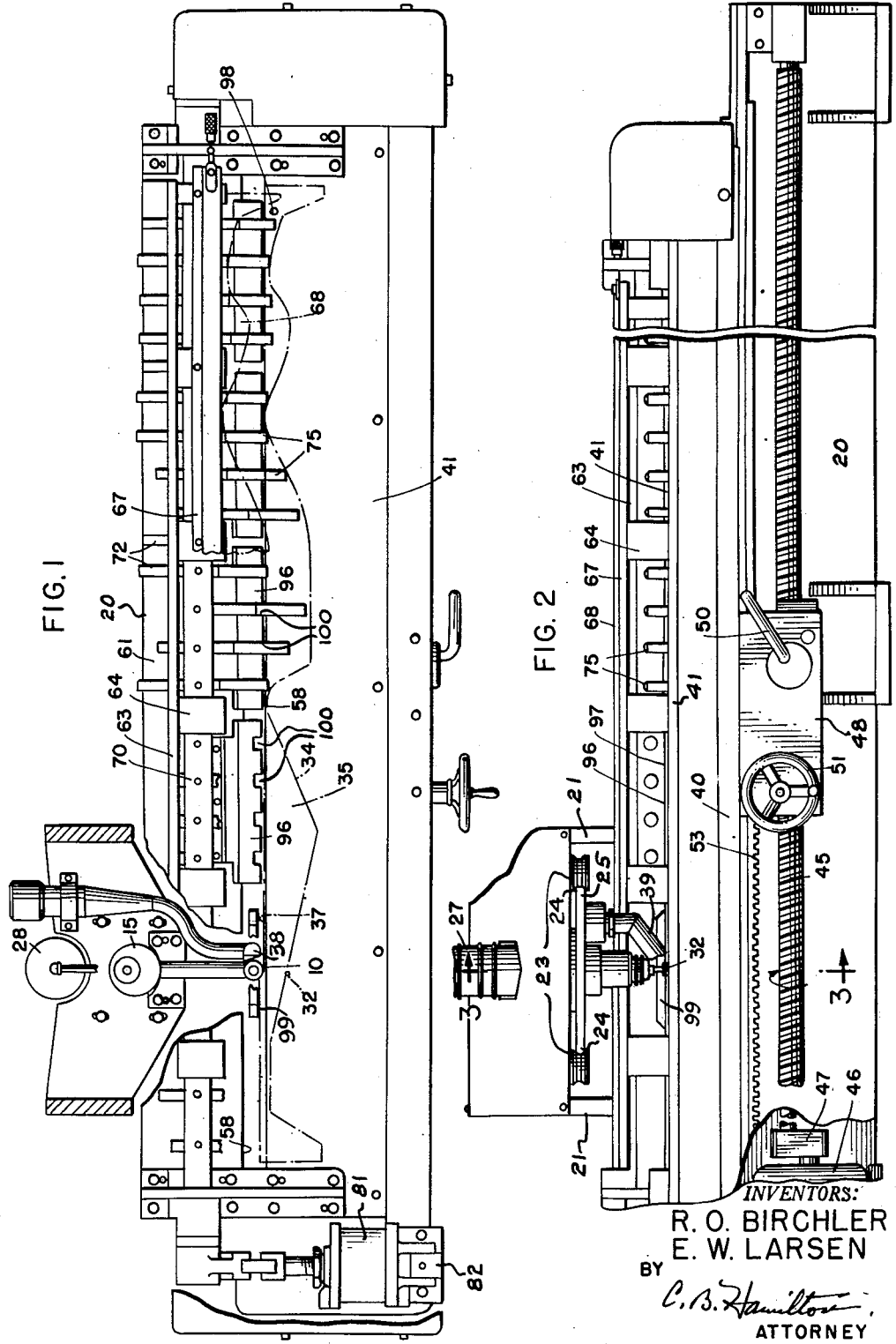

INVENTORS:
R. O. BIRCHLER
E. W. LARSEN
BY
C. B. Hamilton
ATTORNEY

United States Patent Office 2,790,359
Patented Apr. 30, 1957

2,790,359

APPARATUS FOR PROFILING ARTICLES

Robert O. Birchler, Cicero, and Einer W. Larsen, Elmhurst, Ill., assignors to Western Electric Company, Incorporated, New York, N. Y., a corporation of New York Application November 23, 1953, Serial No. 393,762

9 Claims. (Cl. 90—13)

This invention relates to apparatus for profiling articles, and more particularly to apparatus for profiling potentiometer cards.

In the manufacture of potentiometer cards wherein one edge of each card is straight and the other is profiled, the cards are cut on one or both edges to very precise dimensions. In the past, the apparatus for cutting the cards has been expensive and complicated both in original construction and maintenance.

An object of the invention is to provide new and improved apparatus for profiling articles.

Another object of the invention is to provide apparatus for profiling potentiometer cards.

A further object of the invention is to provide apparatus for cutting precisely both a profile edge and a straight edge on a potentiometer card at the same time.

A further object of the invention is to provide an apparatus for cutting opposite edges of a profiled potentiometer card simultaneously with rigidly mounted cutting elements.

An apparatus illustrating certain features of the invention may include a cutter mounted on a fixed axis for cutting one edge of a potentiometer card and a second cutter mounted on an axis movable toward and away from the first cutter for cutting an opposite edge of the potentiometer card. A carriage is provided for moving a potentiometer card longitudinally between two cutters. Clamping means operable to clamp cards with the same degree of force regardless of the profiles to be cut on the cards is provided for clamping cards to be cut to the carriage.

A complete understanding of the invention may be obtained from the following detailed description of an apparatus forming a specific embodiment of the invention, when read in conjunction with the appended drawings, in which Fig. 1 is a top plan view, with portions thereof broken away, of an apparatus forming one embodiment of the invention;

Fig. 2 is a front elevation of the apparatus shown in Fig. 1;

Figure 3:
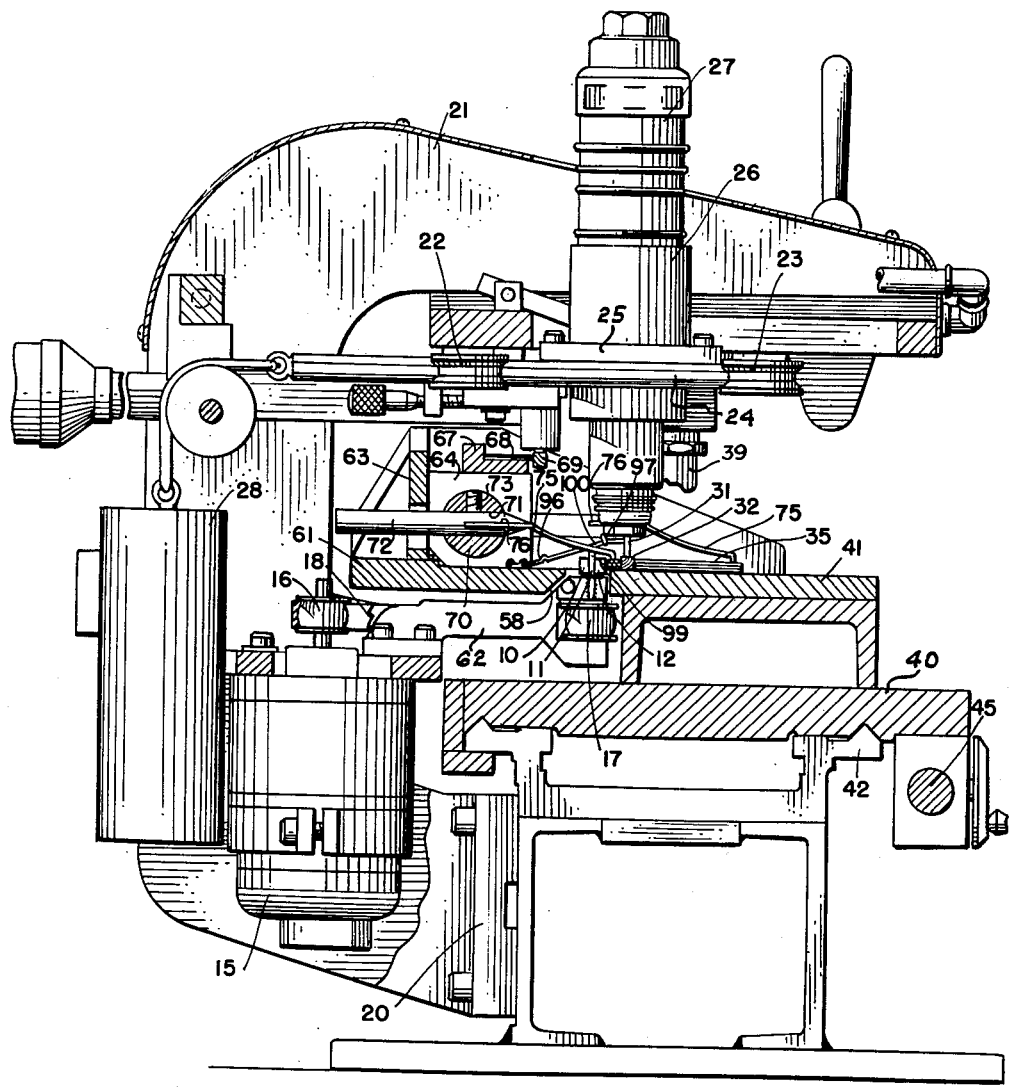
Fig. 3 is an enlarged, vertical section taken along line 3—3 of Fig. 2.

Referring now in detail to the drawings, there is disclosed therein a conventional toothed cutter 10 (Fig. 3) mounted on a shaft 11 rotatable on a fixed axis determined by a rigidly mounted bearing 12, the cutter 10 being driven by an electric motor 15 through pulleys 16 and 17 and a belt 18. These elements are mounted on a stationary frame 20, which includes cantilever standards 21 having opposed pairs of pulleys or guide rollers 22 and 23 thereon serving to mount slide portions 24 fixed to a carriage 25 rigidly mounting a bearing 26 supporting an electric motor 27. A counterweight 28 urges the carriage 25 continuously toward the left, as viewed in Fig. 3. A shaft 31 driven continuously by the motor 27 mounts a conventional toothed milling cutter 32 thereon, which is designed to bear against the righthand edges 34 of a stack of potentiometer cards 35, as viewed in Fig. 3, the righthand edge of each card to be precisely profiled and having already been roughly profiled. The cutter 10 serves to grind a back or straight edge 37 of the cards 35 while the cutter 32 cuts the profiled edges of the cards. Exhaust nozzles 38 and 39 (Figs. 1 and 2) are positioned adjacent to the cutters 10 and 32.

The cards are mounted on a work-supporting plate 41 rigidly supported on a carriage 40 slidable along a lathe bed 42, and the carriage may be driven to the right, as viewed in Figs. 1 and 2, by a feed screw 45 driven by an electric motor 46 through a gear reducer 47 to move the carriage from left to right during the cutting operation of the cutters 10 and 32. After the carriage 40 has been moved to its extreme righthand position by the screw 45 and a lathe feed nut (not shown) in an apron 48 on the carriage 40, the motor 46 is stopped by suitable automatic means such as a limit switch (not shown), and a lever 50 is actuated manually to release the carriage from the drive screw 45, and a handwheel 51 is rotated to turn a pinion (not shown) meshing with a stationary rack 53 to move the carriage 40 back to the left to its starting position.

The work-supporting plate 41 (Fig. 3) is provided with a slot 58 therein to provide clearance for the bearing 12 as the carriage is moved along the cutters 10 and 32. The carriage 40 also includes an overhanging portion 61 extending back of the cutter 10 under the cantilever standards 21 and over a cantilever bracket 62 supporting the pulley 17. A vertical bar 63 mounted on the overhanging portion 61 serves to support bearings 64. A support 67 mounted on the bearings 64 serves to carry rigidly a profile template 68 against which a cam follower 69 is continuously urged by the counterweight 28, whereby the position of the cutter 32 is always controlled by the profile on the template 68.

Figure 4:
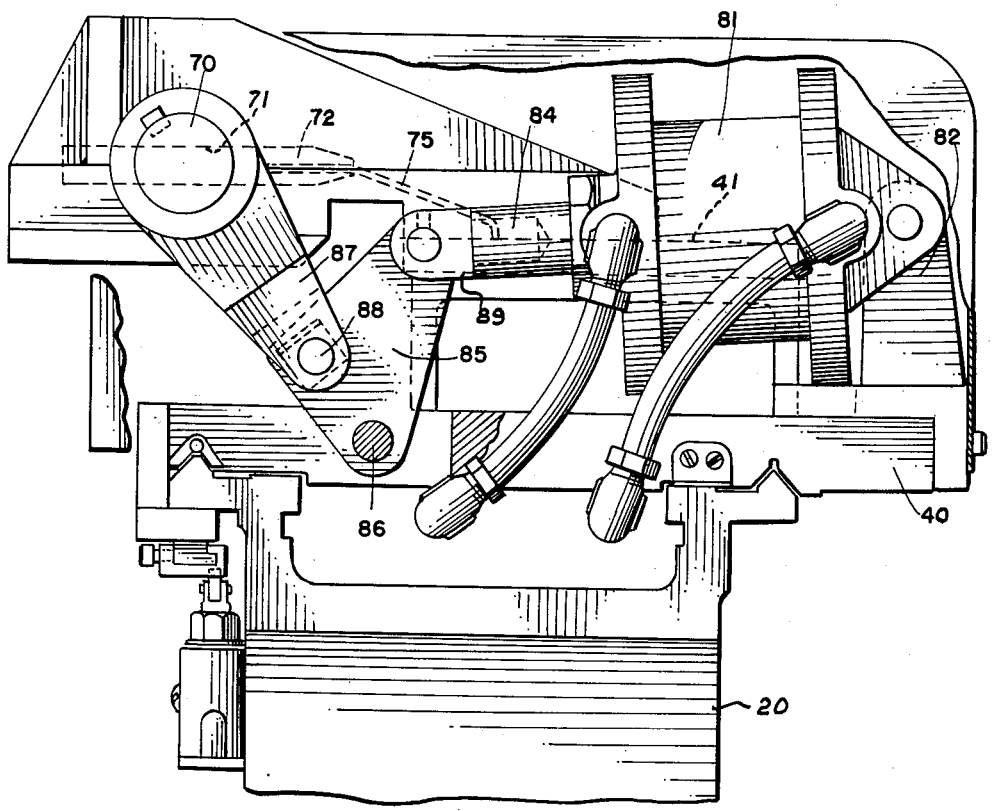
Fig. 4 is a side elevation of the apparatus shown in Fig. 1.
Figure 5:
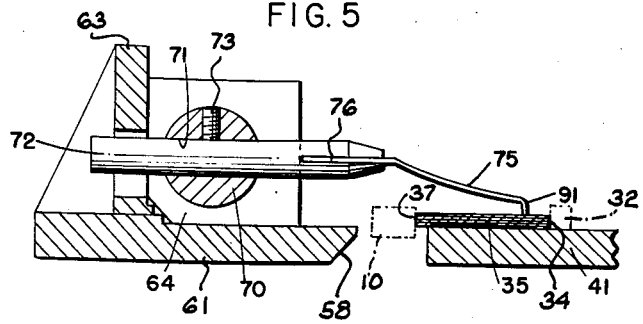
Fig. 5 is an enlarged, fragmentary, vertical section of a portion of the apparatus shown in Fig. 3.

A shaft 70 provided with transverse bores 71 parallel to one another for mounting slidable rods 72 is mounted rotatably in the bearings 64, and set screws 73 serve to lock rigid clamp rods 72 in desired positions in the bores 71. Leaf spring clamps 75 (Fig. 5) are fastened rigidly to the rods 72 in slots 76 in the rods, and each of the clamps 75 is identical with the other clamps in shape, length and strength. When a pneumatic cylinder 81 mounted pivotally on a bracket 82 supported by the carriage 40 is actuated to drive a piston 84 toward the left to its position shown in Fig. 4, the piston turns an arm 85 about a fixed pin 86, the arm turning an arm 87 through a pin 88 in a clockwise direction. The arm 87 turns the shaft 70 to a position in which all the clamping rod 72 are horizontal and parallel to the work-supporting plate 41. The cylinder may be actuated by a conventional four-way valve (not shown) to move the piston to the right to turn the shaft 70 in a counterclockwise direction to swing the clamps 75 away from the plate 41. A clevis 89 adjustably connects the piston to the arm 85.

The clamps 75 are provided with downwardly turned fingers 91 designed to engage the uppermost card 35 to be cut and hold the cards securely to the carriage plate 41. Roughly one-half of the clamps 75 engage the cards just inside the profiled edges 34 of the cards, and the other half of the clamps engage the cards 35 near the straight edges 37 of the cards. Each clamp 75 exerts the same amount of force on the cards 35 as the other clamps 75, although the clamps 75 engage laterally varying portions of the cards. This is true because each rod 72 supporting one of the clamps 75 is rigid and extends exactly parallel with the upper face of the carriage plate 41 and the upper face of the uppermost card 35, which it engages. Thus, for each of the clamps 75, the lefthand end thereof is at the same level as the others and the righthand end thereof engages the uppermost card 35 in the same flexed position as each of the other clamps. Since each rod 72 is parallel to the upper card 35 and each of the clamps 75 is identical with the others in flexing strength and in horizontal distance between the fingers 91 and the rigid rods 72 so that the flexing length of each clamp 75 is identical, the force exerted by each of the clamps does not vary regardless of the distance of the fingers 91 from the shaft 70.

Gages 96 hinged to the overhanging portion 61 of the carriage plate 41 normally serve as a stop in positioning the cards 35 on the carriage plate 41 prior to the clamping of the cards thereon, transverse fingers 97 being provided on the gages 96. Slots 100 in the gages 96 provide clearance for the clamps 75 when the gages are swung upwardly. The cards may be located longitudinally on the carriage plate 41 by a pin 98 projecting upwardly from the carriage plate, over which pin locating holes formed in the cards fit. The gages 96 project over the slot 58, and, as each of the gages 96 is moved to the cutter 10, a cam 99 mounted on the supporting structure of and extending over the cutter 10 pivots the gage 96 upwardly above the cutter 10, and after that gage has passed the cutter 10, the cam permits the gage to drop by gravity back to its former position. The fingers 91 of the clamps 75 are sufficiently long that the clamps clear the cam 99 and exert full clamping force on the cards 35 while the cutters 10 and 32 are effective on the portions of the cards adjacent thereto.

*Operation*

With the carriage 41 (Figs. 1 and 2) at its extreme lefthand position, a valve (not shown) connected to the cylinder 81 is actuated, if necessary, to supply air under pressure to the lefthand end thereof and exhaust the righthand end thereof. This moves the piston 84 to its extreme righthand position which turns the shaft 70 to its nonclamping position in which the clamps 75 are lifted completely away from the carriage plate 41 on which the cards 35 to be profiled are to be clamped. The carriage 25 is moved manually to its extreme righthand position, as viewed in Fig. 3, and is held there by suitable means (not shown). The stack of cards 35 then is placed on the carriage plate over the pin 98, and is slid laterally on the carriage plate until all the edges thereof engage the gages 96 to locate precisely the cards laterally on the carriage plate. The operator then actuates the cylinder 81 to move the piston 84 to the left, as viewed in Fig. 4, which turns the shaft 70 in a clockwise direction until the rods 72 are horizontal, which movement brings the clamps 75 against the cards 35 and holds the cards 35 down on the carriage plate 41 with a predetermined force regardless of the varied positions of the rods 72 relative to the shaft 70. Each of the clamps 75 clamps the cards on a portion of the stock that is not to be cut away during the profiling and back edge cutting operations.

The motors 15 and 27 (Fig. 3) are then started to rotate the cutters 10 and 32 at high speed, the carriage 25 then is released and moves to the left, as viewed in Fig. 3, as far as permitted by the template 68, and the motor 46 (Fig. 2) is started to turn the lead screw 45, which moves the carriage 40 to the right, as viewed in Figs. 1 and 2, and moves the cards 35 between the cutters 10 and 32, which cut such an amount of stock from the roughed out cards that is necessary to bring the cards precisely to the profile and straight back edge dimensions. The counterweight 28 urges the carriage 25 carrying the cutter 32 continuously to the left to maintain the cam follower roll 69 against the template 68 throughout the cutting operation.

As each gage 96 (Figs. 1 and 3) approaches the cutter 10, the cam 99 lifts the gage 96 upwardly on its hinge so that it clears the cutter 10 and the gage 96 moves over the cutter 10 without contacting it. The gages 96 are provided with slots 100 which are aligned laterally with the clamps 75 and are of a width slightly greater than that of the clamps 75 so that the righthand edges of the gages 96, as viewed in Fig. 3, arise above the righthand portions of the clamps 75 without interference therebetween. After each gage 96 passes the cutter 10, the cam 99 permits it to drop back down to its former position. After the entire length of the cards has been cut, the motors 46, 15 and 27 are stopped and the operator pulls the cutter 32 away from the cutter 10 to provide clearance, actuates the lever 50 to release the carriage from the lead screw 45 and rotates the handwheel to turn the carriage to its extreme lefthand position after which the operator actuates the cylinder 81 (Fig. 4) to retract the piston 84 to move the clamps to their retracted positions upwardly away from the potentiometer cards 35. The cards then are removed from the apparatus after which the operation described hereinabove may be repeated on a new set of cards.

The above-described apparatus serves to cut both sides of a plurality of potentiometer cards with precision, and mounts the cutters 10 and 32 with great rigidity so that the cuts are made exactly as desired. The potentiometer cards are clamped very securely on the carriage plate 41 with exactly the same force being exerted by each of the clamps 75 so that each batch of cards being profiled by the apparatus is profiled in exactly the same manner as that in which the other batches are profiled, and the clamps hold the cards uniformly along the entire lengths of the cards.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A profiling apparatus, which comprises an elongated work-support plate mounted horizontally, means for longitudinally moving the support plate, a shaft, bearing means toward one side of the upper face of the plate mounting the shaft in a position above the plate, a plurality of clamping arms secured at one end of each to the shaft for pressing an elongated article to be profiled against a predetermined portion of the upper face of the plate in a position extending longitudinally of the plate in the central portion of the upper face of the plate, a slot in the plate positioned so that one edge of the article overhangs one edge of the slot so that that edge of the article may be trimmed, a cutter, means below the plate supporting the cutter in a position extending above the top face of the plate and below the clamping arms so that clearance therebetween is provided, a second cutter, and means mounting the second cutter at the edge of said portion of the plate opposite to the edge thereof adjacent to the slot.

2. An apparatus for profiling potentiometer cards, which comprises a work carriage movable in a predetermined direction and having a slot therethrough extending parallel to said direction, a cutter, a shaft rotatable on a fixed axis and positioning the cutter at one side of the carriage and projecting through the slot in the carriage, means for rotating the shaft, a guideway extending transversely of the direction of movement of the carriage and positioned on said side of the carriage, a second cutter, a cutter carriage mounted on said guideway carrying the second cutter mounted in a position in the same plane as the first cutter, means for moving the second cutter laterally toward and away from the first cutter, means mounted on the cutter carriage for rotating the second cutter, a second shaft mounted rotatably on the work carriage on the side of the slot therein opposite to that on which the second cutter is positioned, a plurality of arms mounted on the second shaft in parallelly extending positions, means for turning the second shaft to a clamping position in which the arms are parallel to the face of the carriage on which articles to be profiled are mounted, and a plurality of identical leaf spring clamps mounted on the ends of the arms for engaging articles to be profiled to clamp the articles against the carriage.

3. An apparatus for profiling potentiometer cards, which comprises a carriage plate having a slot extending therealong, a shaft mounted on one face of the carriage plate at one side of the slot, a plurality of rods fastened to the shaft in longitudinally adjustable positions parallel to one another, a plurality of leaf spring arms secured to the ends of the rods projecting over the slot, means for moving the shaft to a position in which the rods are parallel to the carriage plate and the leaf spring arms engage potentiometer cards to be profiled positioned on a portion of one face of the carriage plate at the side of the slot opposite to that at which the shaft is mounted, a cutter projecting through the slot from the side of the plate opposite to said face on which the cards and shaft are positioned, means for rotating the cutter, a second cutter extending substantially to the face of the carriage plate on which the cards and shaft are mounted, means for urging the second cutter transversely of the slot toward the slot against the edges of the cards most removed from the slot, a cam extending from the side of the slot on which the cards are mounted away from that side of the carriage plate and around the end of the first cutter, and a plurality of gage plates for locating the cards relative to the carriage plate mounted pivotally on the carriage plate on the side of the slot opposite to that at which the cards are positioned, said gages being pivotal out of the plane of the first cutter by the cam as they are moved to the cutter.

4. An apparatus for profiling potentiometer cards, which comprises a carriage plate having a slot extending therealong, a shaft mounted on one face of the carriage plate at one side of the slot, a plurality of rods adjustably fastened to the shaft in positions parallel to one another, a plurality of leaf spring arms secured to the ends of the rods in positions projecting over the slot, means for turning the shaft to a position in which the rods are parallel to the carriage plate and the leaf spring arms engage potentiometer cards to be profiled positioned on one face of the carriage plate on the side of the slot opposite to that at which the shaft is mounted, a cutter projecting through the slot from the side of the plate opposite to that at which the shaft is positioned, means for rotating the cutter, a second cutter positioned adjacent to the side of the carriage plate on which the shaft is mounted, and means for urging the second cutter transversely of the slot toward the slot from the edges of the cards displaced from the slot.

5. An apparatus for cutting opposite edges of potentiometer cards, which comprises a carriage plate having a slot extending therealong, a shaft mounted on one face of the carriage plate on one side of the slot, a plurality of rods adjustably fastened to the shaft in positions parallel to one another, a plurality of clamping arms secured to the ends of the rods projecting over the slot, means for moving the shaft to a position in which the rods are parallel to the carriage and the arms engage potentiometer cards to be profiled positioned on said face of the carriage plate on the side of the slot opposite to that at which the shaft is mounted, a cutter projecting through the slot from the side of the plate opposite to that on which the shaft is positioned, means for rotating the cutter, a second cutter mounted at the side of the plate at which the shaft is mounted and movable toward and away from the first cutter, and means for rotating the second cutter.

6. An apparatus for cutting opposite edges of potentiometer cards, which comprises a carriage plate having a slot extending therealong, a shaft having parallel bores therein mounted on one face of the carriage plate on one side of the slot, a plurality of rods mounted adjustably in the bores in the shaft, means for locking the rods in adjusted positions in the bores, a plurality of leaf spring arms secured to the ends of the rods in positions projecting over the slot, means for moving the shaft to a position in which the rods are parallel to the carriage plate so that the leaf spring arms engage potentiometer cards to be profiled positioned on said face of the carriage plate on the side of the slot opposite to that at which the shaft is mounted, a cutter projecting through the slot from the side of the plate opposite to that on which the shaft is positioned, means for rotating the cutter, and a second cutter for engaging the edges of the cards spaced away from the slot.

7. An apparatus for profiling potentiometer cards, which comprises a carriage movable in a predetermined direction, a plate fixed to the carriage having a slot extending therealong parallel to said direction from a point near one end of the plate to a point near the opposite end of the plate, the portion of the plate including the slot and all the plate on one side of the slot extending laterally beyond the carriage, cutter means mounted on a fixed axis projecting from one side of the plate through the slot in the carriage to a position just beyond the other side of the plate, means for actuating the cutter means, a guideway extending transversely of the direction of movement of the carriage, second cutter means mounted on the guideway in a position extending from the guideway into the same plane as the portion of the first cutter means projecting beyond the slot, means for moving the second cutter means laterally toward and away from the first cutter means, means carried with the second cutter for driving the second cutter means, a shaft mounted rotatably on the portion of the plate extending laterally beyond the carriage, a plurality of arms having laterally projecting fingers mounted in parallelly extending positions on the shaft, means for rotating the shaft to a clamping position in which the ends of the fingers engage the articles to be profiled and clamp the articles against the plate, said fingers extending a sufficient distance laterally of the arms that clearance for the first cutter means is provided.

8. A work-holder, comprising a support having a plane surface against which an article is to be clamped, a plurality of identical resilient clamps, a plurality of rigid members mounting the clamps at the same point on each clamp, means mounted for pivotal movement about an axis offset from said surface, adjustable means securing the members to the pivotal means in parallel positions, and means for actuating the pivotal means to move the clamps to positions engaging the article and the members to positions parallel to said surface.

9. A work holder, comprising a support having a plane article-clamping surface, a shaft having a plurality of laterally spaced parallel transverse bores, a plurality of rigid rods mounted slidably in the bores, means for locking the rods against sliding movement in the bore, a plurality of identical L-shaped leaf springs fastened rigidly at one end of each spring to the ends of the rods, and means for moving the shaft to a position in which the rods are parallel to the article-clamping surface in which the free ends of the clamps press an article against that surface.

(References on following page)

References Cited in the file of this patent

UNITED STATES PATENTS

| | | |
|---|---|---|
| 669,882 | Mobley | Mar. 12, 1901 |
| 691,267 | Hill | Jan. 14, 1902 |
| 946,507 | Green | Jan. 11, 1910 |
| 1,077,380 | Wellman | Nov. 4, 1913 |
| 1,366,769 | Cowan | Jan. 25, 1921 |
| 2,055,031 | Hutchings | Sept. 22, 1936 |
| 2,264,508 | Carson | Dec. 2, 1941 |
| 2,304,580 | Luers | Dec. 8, 1942 |
| 2,412,619 | Kindermann | Dec. 17, 1946 |
| 2,548,669 | Hafer | Apr. 10, 1951 |

FOREIGN PATENTS

| | | |
|---|---|---|
| 274 | Great Britain | Jan. 29, 1869 |
| 328,165 | Great Britain | Apr. 24, 1930 |